US009423926B2

(12) United States Patent
Ouzts et al.

(10) Patent No.: US 9,423,926 B2
(45) Date of Patent: Aug. 23, 2016

(54) METHOD FOR GRAPHICAL REPRESENTATION OF A CONTENT COLLECTION

(71) Applicant: MICROSOFT TECHNOLOGY LICENSING, LLC, Redmond, WA (US)

(72) Inventors: Todd Ouzts, Redmond, WA (US); Philip Fortier, Redmond, WA (US); Chris J Guzak, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 196 days.

(21) Appl. No.: 14/015,656

(22) Filed: Aug. 30, 2013

(65) Prior Publication Data
US 2014/0007014 A1    Jan. 2, 2014

Related U.S. Application Data

(63) Continuation of application No. 09/982,337, filed on Oct. 18, 2001, now Pat. No. 8,549,434.

(51) Int. Cl.
*G06F 3/0482* (2013.01)
*G06F 3/0481* (2013.01)
*G06T 11/60* (2006.01)

(52) U.S. Cl.
CPC ............ *G06F 3/0482* (2013.01); *G06F 3/0481* (2013.01); *G06T 11/60* (2013.01)

(58) Field of Classification Search
CPC ...... G06F 3/0482; G06F 3/0481; G06T 11/60
See application file for complete search history.

(56) References Cited

U.S. PATENT DOCUMENTS

| 5,060,135 | A |   | 10/1991 | Levine et al. |
| 5,065,347 | A |   | 11/1991 | Pajak et al. |
| 5,388,196 | A |   | 2/1995 | Pajak et al. |
| 5,533,110 | A |   | 7/1996 | Pinard et al. |
| 5,586,237 | A | * | 12/1996 | Baecker ............. G06F 3/04817 345/670 |
| 5,680,558 | A |   | 10/1997 | Hatanaka et al. |

(Continued)

OTHER PUBLICATIONS

Faichney, Jolon, et al,. "Goldleaf Hierarchican Document Browser", Second Australasian User Interface Conf., AUIC 2001, vol. 23, No. 5, Gold Coast, Queensland, Australia, Jan. 29- Feb. 1, 2001 , pp. 13-20.

(Continued)

*Primary Examiner* — Anil Bhargava
(74) *Attorney, Agent, or Firm* — Jim Banowsky; Judy Yee; Micky Minhas

(57) ABSTRACT

A method use on a computer having a graphical operating environment is provided for displaying the content items of a container. The method includes enumerating the items that exist within the container or folder and determining whether a graphical preview can be generated for the item. If so, the item is added to a list of candidates as preview items for the container or folder. The items are then evaluated, and a desired number are chosen for display based upon a sort criteria. Prior to being displayed, the graphical preview for each item is sized and is located on the background image. The above method results in a container having graphical or pictorial indicia of the container contents on the outside thereof. These indicia allow a computer user to more readily determine the contents of the container or folder without having to open the container or folder.

19 Claims, 4 Drawing Sheets

(56) References Cited

U.S. PATENT DOCUMENTS

| | | | |
|---|---|---|---|
| 5,781,175 | A | 7/1998 | Hara |
| 5,887,088 | A | 3/1999 | Kurokawa et al. |
| 5,917,488 | A * | 6/1999 | Anderson ......... G06F 17/30274 707/E17.029 |
| 6,191,807 | B1 | 2/2001 | Hamada et al. |
| 6,288,719 | B1 * | 9/2001 | Squilla ................ H04N 1/3875 358/403 |
| 6,496,206 | B1 * | 12/2002 | Mernyk ................ G06F 3/0481 715/764 |
| 6,545,687 | B2 | 4/2003 | Scott et al. |
| 6,753,888 | B2 | 6/2004 | Kamiwada et al. |
| 6,947,959 | B1 * | 9/2005 | Gill ................... G06F 17/30011 707/999.003 |
| 7,099,869 | B1 | 8/2006 | Forstall et al. |
| 2001/0009420 | A1 * | 7/2001 | Kamiwada ........... G06F 3/0481 345/629 |
| 2001/0013877 | A1 | 8/2001 | Fujino |
| 2002/0075330 | A1 | 6/2002 | Rosenzweig et al. |
| 2002/0089540 | A1 * | 7/2002 | Geier .................... G06F 3/0481 715/764 |
| 2003/0169302 | A1 * | 9/2003 | Davidsson .......... G06F 3/04886 715/810 |

OTHER PUBLICATIONS

Houde, Stephanie, et al. "Working Towards Rich & Flexible File Representations", CHI '93, Amsterdam, The Netherlands, Apr. 24-29, 1993, pp. 9-10.

Kuchinsky, Allan, et al., FotoFile: A Consumer Multimedia Organization and Retrieval System, CHI '99, Pittsburgh, PA, pp. 496-503.

Terveen, Loren, et al., "Collaborative Filtering to Locate, Comprehend, and Organize Collections of Web Sites", SIGART Bulletin, Winter 1998, pp. 10-17.

Poole, Lon, Macworld, Mac OS 8.5 Bible, 1999, IDG Books Worldwide, Inc., 123 and 159. This document is not available.

Advisory Action, mailed Aug. 17, 2007, in U.S. Appl. No. 09/982,337.

Advisory Action, mailed Aug. 3, 2007, in U.S. Appl. No. 09/982,337.

Advisory Action mailed Apr. 2, 2007, in U.S. Appl. No. 09/982,337.

Final Office Action, mailed Jan. 16, 2007, in U.S. Appl. No. 09/982,337.

Non Final Office Action, mailed Jul. 12, 2006, in U.S. Appl. No. 09/982,337.

Advisory Action mailed Apr. 13, 2006, in U.S. Appl. No. 09/982,337.

Final Rejection mailed Jan. 23, 2006, in U.S. Appl. No. 09/982,337.

Non Final Office Action mailed Aug. 5, 2005 in U.S. Appl. No. 09/982,337.

Advisory Action mailed Apr. 26, 2005, in U.S. Appl. No. 09/982,337.

Final Office Action mailed Feb. 7, 2005 in U.S. Appl. No. 09/982,337.

Non Final Office Action mailed May 19, 2004 in U.S. Appl. No. 09/982,337.

* cited by examiner

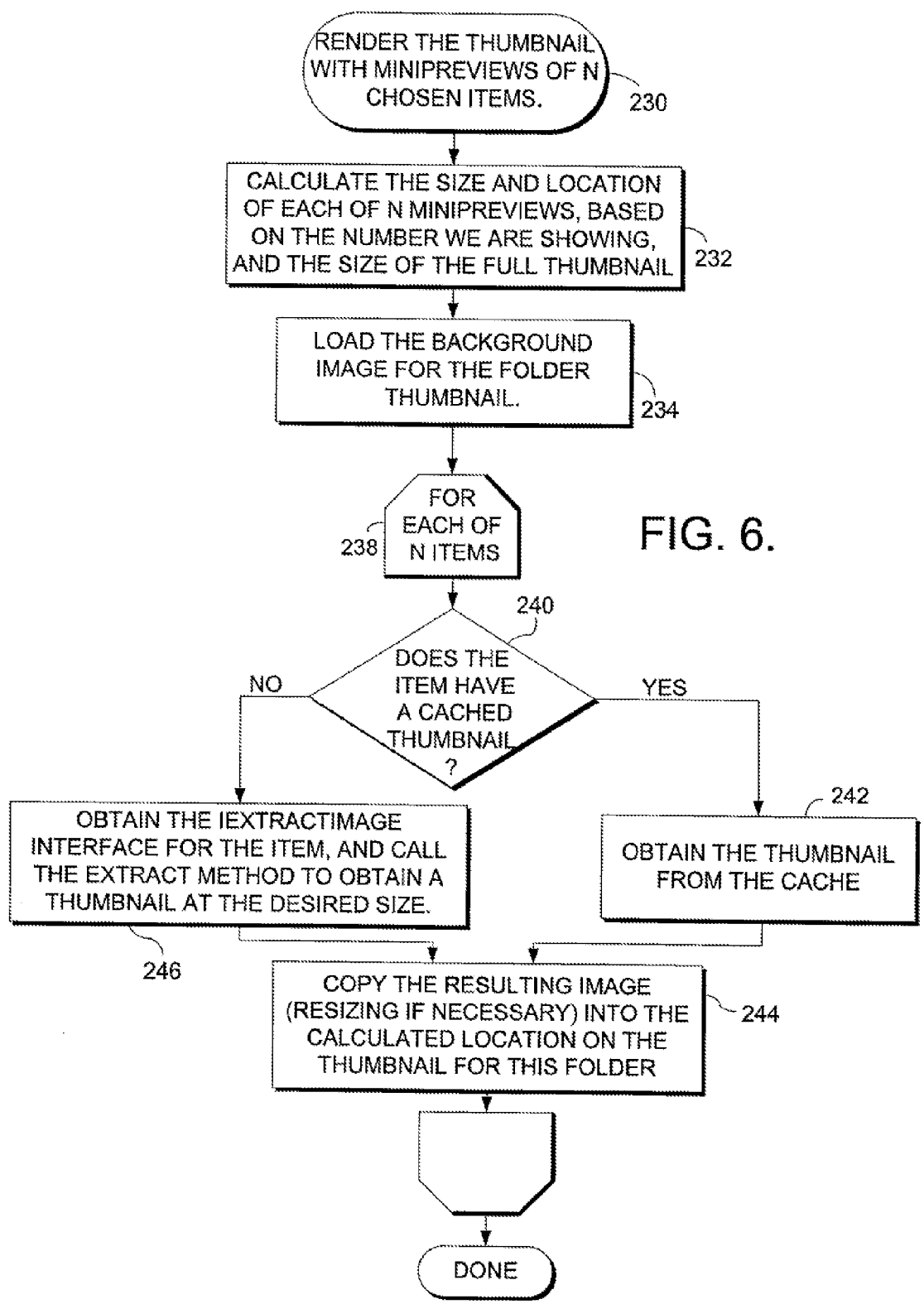

METHOD FOR GRAPHICAL REPRESENTATION OF A CONTENT COLLECTION

PRIORITY

This patent application is a continuation of U.S. Ser. No. 09/982,337, filed 18 Sep. 2001, which is incorporated by reference in its entirety.

STATEMENT REGARDING FEDERALLY-SPONSORED RESEARCH OF DEVELOPMENT

None.

CROSS-REFERENCE TO RELATED APPLICATIONS

None.

TECHNICAL FIELD

The present invention relates to a method and a computer system, and, more particularly, a computer system and method that allows the content of a collection of items to be graphically represented in a way that provides an indication of the content without opening the container holding the contents.

BACKGROUND OF THE INVENTION

The storage and retrieval of information on a computer has evolved over time. At one point in time, files were stored in a computer in a location represented by a textual path name. The computer user would specify this path name when saving the contents and storing the contents on a storage device, such as a hard drive for the computer. To retrieve the information that had been stored, the user would again reference the textual path name that had been given to the container, such as the file name. Graphical operating environments have largely simplified this process.

In the prior art graphical operating environments, a container that holds a collection of items may be called a folder. Within the folder, the items are typically referred to as files. In the prior art graphical operating environment, the folders may be given a textual name, and are typically graphically represented with the general outline of a file folder. When the computer user opens the folder, the contents of the folder are revealed.

The items contained within any collection may take a variety of forms. For example, the items may be documents, images, graphs or charts, or any other type of file or item that is typically saved within a computer system. The contents of a folder may be displayed in a variety of ways. For example, the items may be arranged in a list with textual titles. These titles may also have an associated icon or symbol. The contents may also be arranged on the computer display with the icons more prominently displayed.

If an item is an image file, the contents of the file may be represented in a "thumbnail" view. A thumbnail is a miniature version of an image or electronic version of a page that is generally used to allow quick browsing through multiple images or pages. A thumbnail view is a graphical representation for that file that is particular to that file, and that shows a preview of an image contained within the file. In other words, these thumbnail views exist as a mechanism of graphically representing the contents of a particular item or file without having to open the file itself.

It has been found that some computer users have a difficult time navigating to a particular item within a computer system. This problem exists even on those computers having a graphical operating system. Thus, the efforts of a computer user trying to locate a particular image, for example, might involve that computer user navigating to, and opening, several folders prior to finding the folder containing the desired item. One example of a prior art graphical representation for a folder is shown in FIG. 2. As can be seen, the overall item, labeled A, is in the general shape of a file folder. As can also be seen, the folder icon (A) may have text associated with it. In this environment, then, the computer user must be able to remember the contents of the folder from the text label to properly navigate to a desired file, because each folder icon (A) within the organization of folders appears the same. If the user cannot remember the contents of the folder from the textual message, the user is forced to open the folder to reveal its contents, and to check to see if the desired item is contained within the folder. As can be appreciated, this process can become frustrating to a computer user if the desired item is not quickly found.

Accordingly, there is a need for an effective system and method that efficiently conveys to a computer user some indicia of the contents of a folder or container, without having to open the folder or container.

SUMMARY OF THE INVENTION

The present invention provides a method and system for use on a computer having a graphical operating environment. The method includes enumerating the items that exist within the container or folder and determining whether a graphical preview can be generated for the item. If so, the item is added to a list of candidates as preview items for the container or folder. The items are then evaluated, and a desired number chosen for display based upon a sort criteria. Prior to being displayed, the graphical preview for each item is sized and is located on the background image. The above method results in a container having graphical or pictorial indicia of the container contents on the outside thereof. These indicia allow a computer user to more readily determine the contents of the container or folder without having to open the container or folder.

Additional advantages and novel features will be set forth in the description which follows and in part may become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein:

FIG. 6 is a flow chart illustrating the method for rendering the graphical images on the folder or container background.

DETAILED DESCRIPTION OF THE INVENTION

Figure 1:
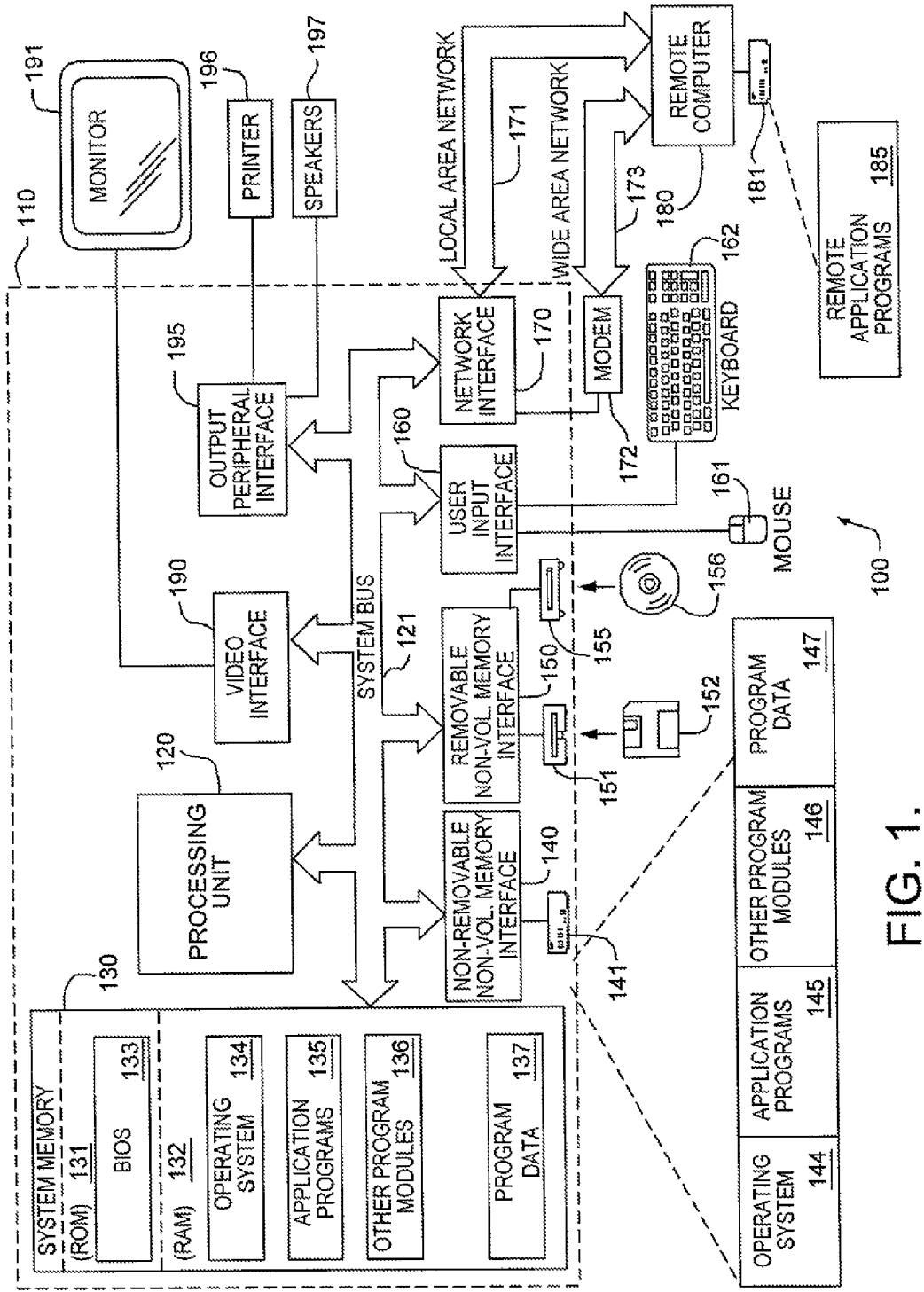
FIG. 1 is a block diagram of a computing system environment suitable for use implementing the present invention.

The present invention provides a system and method for allowing a graphical representation of the contents of a container on the outside of the container so that a computer user does not have to open the container to view all of the contents thereof. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, cellular phones, personal digital assistants (PDAs), multiprocessor systems, microprocessor-based systems, set top boxes, programmable consumer electronics, network PCs, minicomputers, mainframe computers, and distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and nonremovable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB) A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 1.95.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Those skilled in the art will understand that program modules such as the operating system 134, application programs 135 and data 137 are provided to the computer 110 via one of its memory storage devices, which may include ROM 131, RAM 132, hard disk drive 141, magnetic disk drive 151 or optical disk drive 155. Preferably, the hard disk drive 141 is used to store data 137 and programs, including the operating system 134 and application programs 135.

When the computer 110 is turned on or reset, the BIOS 133, which is stored in the ROM 131 instructs the processing unit 120 to load the operating system from the hard disk drive 141 into the RAM 132. Once the operating system 134 is loaded in RAM 132, the processing unit 120 executes the operating system code and causes the visual elements associated with the user interface of the operating system 134 to be displayed on the monitor 191. When a user opens an application program 135, the program code and relevant data are read from the hard disk drive 141 and stored in RAM 132.

Figure 2:
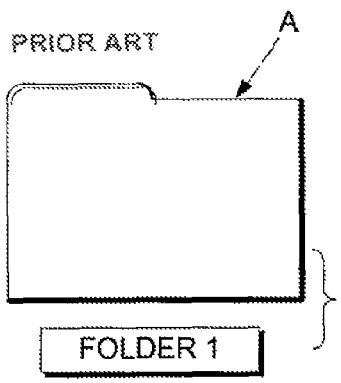
FIG. 2 is a representation of a prior art folder icon.

As discussed above, the prior art graphical operating environment could display a collection of items as shown in FIG. 2. The display is controlled by an item collection manager. This representation typically involves an icon or symbol, labeled A in FIG. 2. The icon shown in FIG. 2 is generally rendered to appear as a closed file folder. The prior art environment could also include a textual message associated with the icon. To retrieve items from the folder (A), the user opens the folder to reveal the contents, and may then select an item for further processing. As stated above, the problem with this system is that the contents of the folder (A) may be navigated to efficiently only if the user remembers that a particular item is contained within folder (A). Usually, this involves the user associating a particular item with the textual message associated with the folder.

As used in this specification, a folder may also be referred to as a container, or vice versa. A folder is a container for programs and files in graphical user interfaces, usually symbolized on the screen by a graphical image or icon of a file folder. This container may be referred to as a directory in other systems. Thus, a folder is a mechanism of organizing programs and documents or other items and can hold both files and additional folders. A file is the basic unit of storage that enables a computer to distinguish one set of information from another. A file is the "glue" that binds a conglomeration of instructions, numbers, words, or images into a coherent unit that a user can retrieve, change, delete, save or send to an output device.

Figure 3:
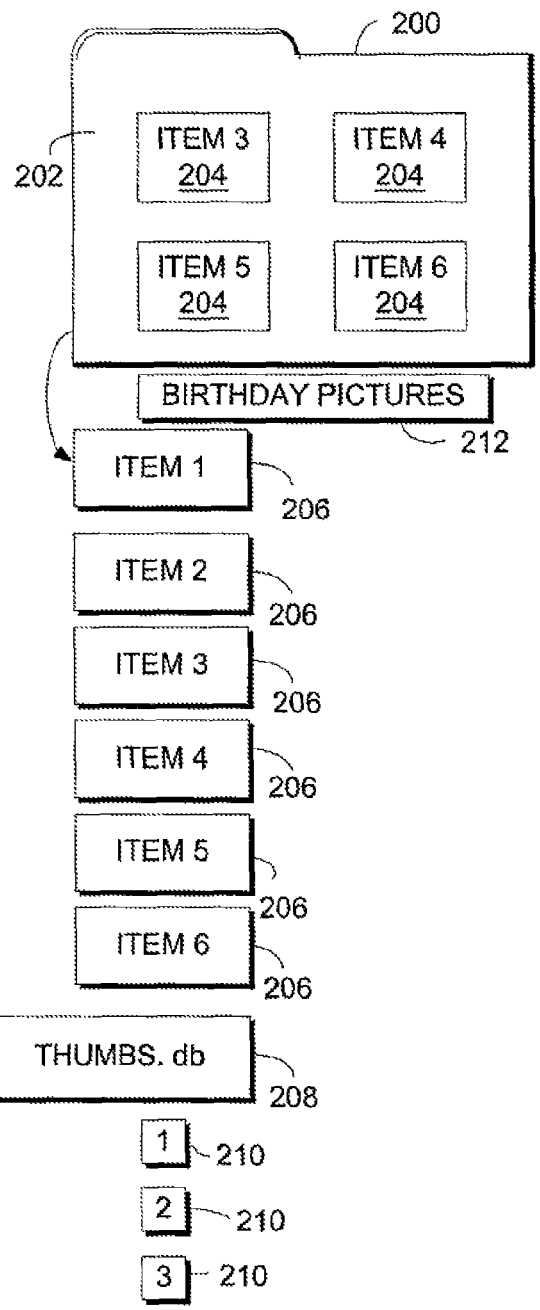
FIG. 3 is a schematic view of the images and associated items within a container or folder according to the principles of the present invention.

FIG. 3 illustrates the appearance of one example of a folder 200 of the present invention. As shown, folder 200 has a background 202. Background 202 is preferably slightly larger that the folder icon (A) illustrated in FIG. 2. Background 202 is shown in the same general configuration as folder icon (A) to resemble a closed file folder. It should be understood, however, that other background shapes and representations could be used. For example, background 202 could be rendered to resemble a photo album, or could be simply a square that might be used to represent a record album or musical compact disc. A number of smaller images 204 are rendered on background 202. Images 204 are representations, on a smaller scale, of items that are contained within folder 200. Images 204 are what are referred to as "thumbnail" images. A thumbnail image is a graphical representation for a file, that is particular to the file, and that shows a preview of an image contained within the file. Images 204 serve the purpose of indicating to the user, in a graphical form, the contents of the folder 200. As shown in FIG. 3, four images 204 are shown. The number of images rendered corresponds to the number of images that can be rendered on the background 202 without becoming so small in size as to be meaningless to the user. It should therefore be understood that more, or fewer, images could be rendered on background 202 without departing from the scope of this invention.

The folder 200 will frequently contain more items than those that are represented as thumbnail images 204. As an example, FIG. 3 schematically represents six items 206 that are contained within folder 200. Items 206 are also labeled as ITEM 1 through ITEM 6, respectively, in FIG. 3. Items 206 may be referred to as files as well. Items 206 may be a variety of types, including, but not limited to, documents, image files, HTML documents, application files, music files, and folders.

The folder 200 may also contain a database of previously generated thumbnail images, called a thumbnail cache 208. If any of items 206 are items for which a thumbnail image can be generated, and a thumbnail image has in fact been previously generated for the item, the thumbnail image will be stored within cache 208. The importance and use of cache 208 are more fully described below. For example, if a thumbnail image has been generated for items 206 labeled ITEM 1-ITEM 3 in FIG. 3, a thumbnail image 210 will exist within cache 208.

Figure 4:
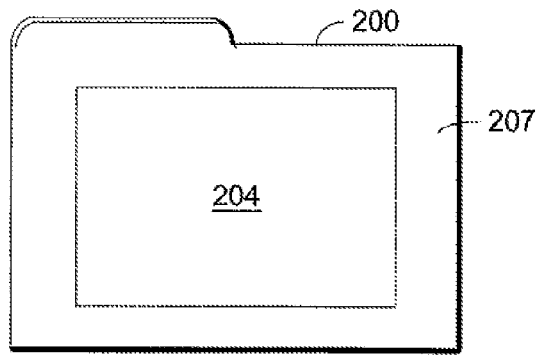
FIG. 4 is a view illustrating a further embodiment of the present invention.

In an alternative embodiment, the user may elect to have only one image 204 displayed on the background 202, as seen in FIG. 4. In the view shown in FIG. 4, the image 204 is sized appropriately to fill a larger portion of background 202. Such a view may be desirable, for example, if the folder 200 contained a number of items 206 that were all easily recognizable by a single image 204. As a more specific example, and without limitation, the image 204 could be representative of a musical album or compact disc cover art, where the items 206 contained within folder 200 are electronic versions of songs from the particular album or music collection.

The invention allows a computer user to more easily and efficiently navigate to a desired item within a collection of items, such as a folder. For example, a computer user may store pictures on the computer. The computer user may organize the pictures by topic or time frame, such that a number of folders exist which contain pictures. As a more specific example, and without limitation, the computer user may have one folder labeled "birthday pictures," and two others labeled "vacation pictures1" and "vacation pictures2." Utilizing the present invention, each folder background 202 will have rendered thereon a number of thumbnail images 204. The thumbnail images for the folder 200 labeled "birthday pictures" will have rendered thereon thumbnail images 204 which appear as reduced images of pictures contained within the "birthday pictures" folder. Similarly, the "vacation pictures1" folder will have rendered thereon thumbnail images 204, which appear as reduced images of pictures contained within the "vacation pictures1" folder. The thumbnail images 204 thus serve as graphical indicia to the computer user regarding the contents of the folder 200. In other words, the computer user is presented with a graphical preview of the folder contents without opening the folder and without having to remember the contents of the folder solely from the textual description associated with the folder. The folder 200 may have a textual description as well, such as the textual description "BIRTHDAY PICTURES" illustrated in FIG. 3 and labeled as 212.

Figure 5:
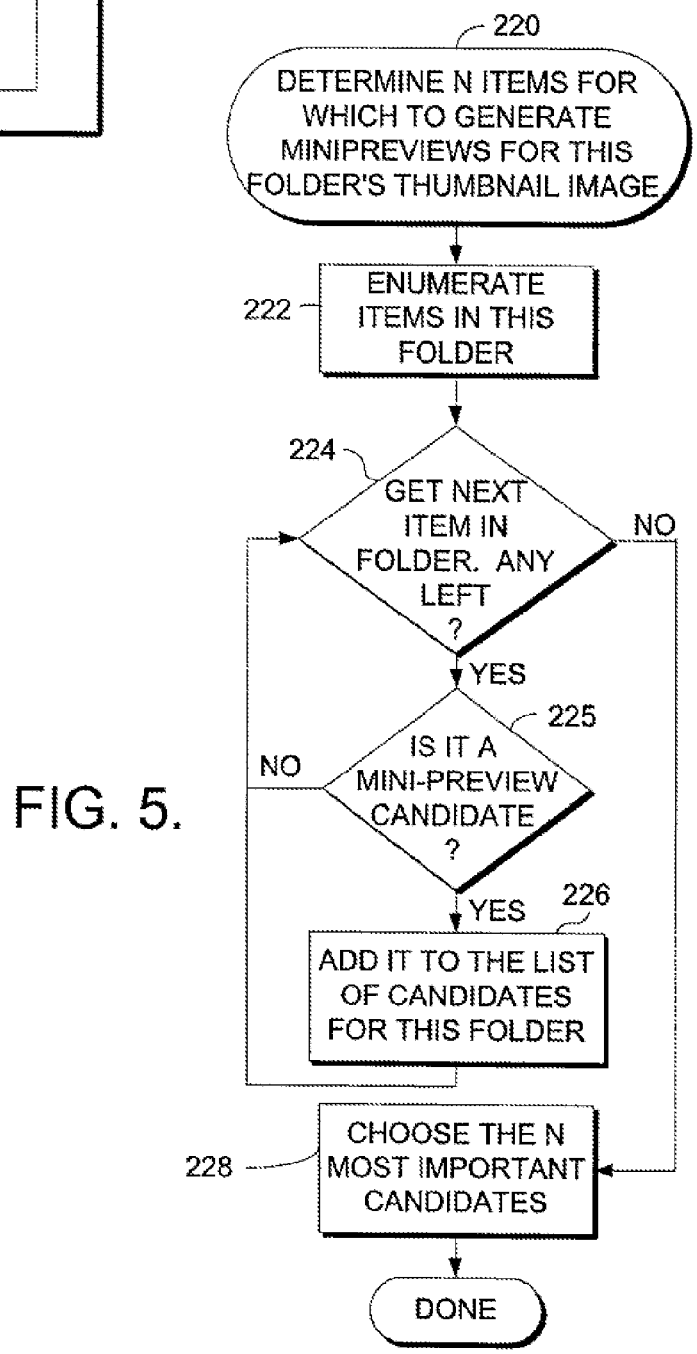
FIG. 5 is a flow chart illustrating the method for determining which images to include on the folder background.

With reference to FIG. 5, one implementation for analyzing the container or folder for the present invention will be discussed. FIG. 5 illustrates the process 220 for determining which, if any, items 206 within the folder 200 are to be rendered on the background 202. The process 220 begins by enumerating the items 206 within the folder 200, as shown at step 22. All items 206 within the folder are enumerated. The items 206 in the folder are then processed in a loop 224 that merely obtains the next item 206 in the folder 200 and determines if any items 206 remain in the folder. For each item within the loop 224, the process determines in step 225 if the item 206 is a candidate to serve as a thumbnail image 204 on the background 202. An item 206 is a candidate if a graphical representation, particular to that item, can be generated that serves as a preview to the contents of the item or file. Any files or items having file extensions for which a thumbnail extractor has been provided are candidates to serve as a thumbnail image 204. In the WINDOWS Operating System, available from Microsoft Corporation of Redmond, Wash., an item 206 is a candidate if an IExtractImage interface can be obtained for the item. The IExtractImage interface is an interface exposed on a folder that the IShellFolders implement. Another requirement that the item 206 must satisfy if it is to serve as an image 204 is that the item must not be a folder. This requirement is imposed so that a generic folder icon does not appear on the background 202. In other words, it has been found that it is not as useful to display a background 202 with graphical representations of folders thereon.

If an item 206 qualifies as a candidate to serve as a preview image 204, it is added to the list of candidates for the folder 200 being processed in step 226 and the process returns to the start of loop 224. Likewise, if an item 206 does not qualify as a preview image candidate, the process returns to the start of loop 224. The loop 224 continues until there are no items 206 left in folder 200. When no items 206 are left for evaluation in folder 200, the process 220 continues in step 228 by choosing the images 204 from the list, generated at step 226, for display on (background 202. As shown in FIG. 3, four images 204 are shown. As stated above, the lumber of images rendered corresponds to the number of images that can be rendered on the background 202 without becoming so small in size as to be meaningless to the user. It should be understood that more, or fewer, images could be rendered on background 202 without departing from the scope of this invention. Once the list of candidates is generated in step 226, the number of images 204 that are desired to be rendered on background 202 is determined.

The specified criteria can be any of a number of metrics that allow the items to be prioritized in a way that is meaningful to the user. The goal is to present to the computer user the images 204 that will best indicate to the user the contents of the folder 200, without having to open the folder itself. In the current preferred method, the N items last modified are chosen in step 228. As the items 206 are being evaluated for candidacy as a thumbnail image 204 in step 225, a sort can be performed on the files in the folder, such that the files are listed starting from the last file modified. The items are then analyzed, as discussed above, and N items (in the example four) 206 that are eligible to serve as images 204 and that are the last four that have been modified in some way are selected for display. This metric brings to the background 202 a meaningful display of images 204, because the displayed images 204 represent those that were most recently before the computer user. Other deterministic methods could, of course, be used and are within the scope of this invention. For example, rather than choosing the items last modified, the process could select the last four items 206 that were added to the folder 200. Another example would be to use the first four items in the current sort order of the folder 200.

If items 206 are identified that are candidates to serve as images 204, then images 204 corresponding to those items 206 will be rendered on the background 202, as described with reference to FIG. 6. However, if no candidates are identified, the folder will appear with a default view appearance. Thus, the folder appears as an icon with a shape resembling that of a closed file folder, like that shown in FIG. 2.

The process 230 of rendering images 204 on background 202 is illustrated in FIG. 6. Process 230 begins after the images 204 have been selected according to the process 220 of FIG. 5. The first step in the rendering process is to calculate the size and location of each of the Ls chosen images 204, based upon the number of images 204 to be rendered and on the size of the background 202, as shown at step 232. In this step, the process is evaluating the layout for each of the thumbnail or preview ages 204, and how they will fit on background 202. After this evaluation, the background image 202 is loaded and displayed in step 234. Again, while image 202 is shown in FIG. 3 as a large, closed file folder, the image could have many different appearances, without departing from the scope of this invention.

Each item 206 which is chosen to be presented as a preview image 204 is evaluated in loop 238. Loop 238 determines, at 240, if the item 206 has a cached thumbnail image. As stated above, the folder 200 may contain a database of previously generated thumbnail images, called the thumbnail cache 208. If any of items 206 are items for which a thumbnail image can be generated, and a thumbnail image has in fact been previously generated for the item, the thumbnail image will be stored within cache 208. The cached thumbnail images are represented by 210 in FIG. 3. If a thumbnail image exists within the cache corresponding to an item which is one of the items chosen to be rendered as image 204 on background 202, then the thumbnail image will be obtained from the cache 208 in step 242. This cached thumbnail image will then be rendered in step 244 within the background 202 at the location and with the size calculated in step 232 above. If however, it is determined that a thumbnail image has not previously been generated and cached, the thumbnail image must be generated at step 246.

As stated above, in the WINDOWS operating system, available from Microsoft Corporation of Redmond, Wash., a thumbnail image may be generated using the IExtractImage interface. The IExtractImage interface is an existing interface that can be used to obtain thumbnail images for files or other items. To obtain the IExtractImage interface for an item within a folder, the "GetUIObjectof" method is used and the item identifier is passed in, along with the interface desired, in this case, the desired interface is the IExtractImage interface. There are two methods associated with the IExtractImage interface—GetLocation and Extract. GetLocation specifies the flags as to how the thumbnail image should be rendered. Extract returns a bitmap for the folder that was specified. Therefore, after obtaining the interface, GetLocation and Extract are used for each of the items 206 which were chosen, and for which no thumbnail cache image existed. In step 244, the thumbnail obtained is rendered on background 202 in the location and at the size calculated in step 232. The process 230 is completed when each of the items 206 that were chosen to be rendered have been painted on background 202 as thumbnail images 204. The resulting folder 200 appears generally as shown in FIG. 3. The processes described above with reference to FIGS. 5 and 6 are executed within the system by what may be broadly referred to as a container display provider.

As a more specific example of the invention, and without limitation, folder 200 of FIG. 3 contains six items or files 206. Files 206 are labeled as ITEM 1-ITEM 6 in FIG. 3. Because a thumbnail image has previously been created for ITEM 1-ITEM 3, a thumbnail cached image 210 exists for each of these items within thumbnail cache 208. In rendering folder 200, the inventive process first enumerates each of the items within folder 200 and determines which, if any, of the items are candidates to appear as images 204 on the background 202. Of those items eligible to appear as images 204, a certain number are chosen. In this example, four items 206 are chosen based upon the last four items that were modified. In this example, ITEM 3-ITEM 6 are the last four items that were modified. Therefore, using the methodology of FIG. 5, thumbnail images 204 will appear on background 202 corresponding to ITEM 3-ITEM 6.

The size and location for each of the images 204 is calculated, based upon four images appearing and on the size of background 202. The background image is located and loaded. For each of ITEM 3-ITEM 6, the process will determine if a cached thumbnail image is available. In this case, a cached thumbnail image is available for ITEM 3 only. Therefore, the cached thumbnail image is used for ITEM 3 and is copied into the calculated location on the background. For each of ITEM 4-ITEM 6, a thumbnail image is generated and rendered on the background 202.

It can be seen that this invention allows users to more efficiently navigate to desired items contained within a collection of items more easily. The collection or folder presents a graphical preview of the contents of the folder without the need to open the folder. Such a preview presents to a user the information in a more usable form, and gives the user more information about any particular folder.

Alternative embodiments of the present invention become apparent to those skilled in the art to which it pertains upon review of the specification, including the drawing figures. The various computer systems and components shown in FIGS. 1-6 and described in the specification are merely exemplary of those suitable for use in connection with the present invention. Accordingly, the scope of the present invention is defined by the appended claims rather than the foregoing description.

We claim:

1. A method for use on a computer having a graphical operating environment, comprising:
   providing a background region to an icon associated with a container;
   determining whether graphical previews can be generated for items in the container to graphically represent respective contents of the items;
   in response to determining that graphical previews can be generated for one or more items in the container, selecting a desired number of items from the one or more items in the container;
   calculating a size and a location of an item of the desired number of items on the background region based at least in part on the desired number and a size of the background region;
   obtaining a graphical preview of the item based at least in part on an interface that can be used to obtain the graphical preview of the item according to the calculated size; and
   causing the graphical preview of the item to be displayed on the background region.

2. The method of claim 1, wherein the container is a folder including a collection of items, the method further comprising:
   determining graphical previews cannot be generated to graphically represent at least one item of the collection of items.

3. The method of claim 1, further comprising:
   retrieving at least one of the respective graphical previews of the desired number of items from a cache.

4. The method of claim 1, wherein the container is an album, and the method further comprising:
   displaying only one graphical preview of a representative item of the one or more items in the album on the background region.

5. The method of claim 1, wherein the selecting comprises selecting a first four items in a current sort order of the container.

6. The method of claim 1, further comprising:
   determining whether a thumbnail extractor has been provided by an operating system function for each of the one or more items.

7. The method of claim 1, wherein the selecting comprises selecting four items from the one or more items in the container to display on the background region.

8. The method of claim 1, further comprising:
   sorting the one or more items based upon their respective most recently modified time.

9. The method of claim 1, further comprising:
   sorting the one or more items based upon those items which were most recently added to the container.

10. The method of claim 1, further comprising sizing the graphical previews on the background region.

11. The method of claim 1, wherein the graphical preview is a thumbnail image of the item.

12. One or more computer-storage hardware storing computer usable instructions for performing a method in a computer system, the method comprising:
- selecting a desired number of items from a container to cause respective graphical previews of the desired number of items to be displayed on a background region of the container;
- calculating a size and a location of an item of the desired number of items on the background region based at least in part on the desired number and a size of the background region;
- obtaining a graphical preview of the item based at least in part on an interface that can be used to obtain the graphical preview of the item according to the calculated size; and
- causing the graphical preview of the item to be displayed on the background region based on the calculated location of the item.

13. The hardware of claim 12, wherein the method further comprising:
- in response to determining the item has a cached graphical preview in a cache, obtaining the cached graphical preview of the item from the cache.

14. The hardware of claim 13, wherein the method further comprising:
- displaying a textual message in addition to the background region and the graphical previews.

15. The media hardware of claim 14, wherein the graphical preview is a preview of an electronic picture contained within the container.

16. A computer system, comprising:
- a processor;
- an item collection manager, coupled to the processor, to generate a collection of items for which respective graphical previews can be generated for the collection of items within a container; and
- a container display provider to select a number of items from the collection of items, calculate respective sizes and locations of the number of items on a background region based at least in part on a size of the background region, and to cause graphical previews of the selected number of items to be displayed on a background region of the container.

17. The system according to claim 16, wherein the container display provider is to display pictorial representations of one or more images associated with the selected number of items.

18. The system according to claim 16, wherein the container display provider is to select the number of items from the collection of items based on a current sort order of the container previously selected by a user of the container.

19. The system according to claim 16, wherein the container display provider is to sort the collection of items based on their respective most recently modified time or their respective time added to the container.

* * * * *